Sept. 21, 1937.　　　　　R. I. WARD　　　　　2,093,626
POWER DIRECTIONAL RELAY
Filed Feb. 8, 1934
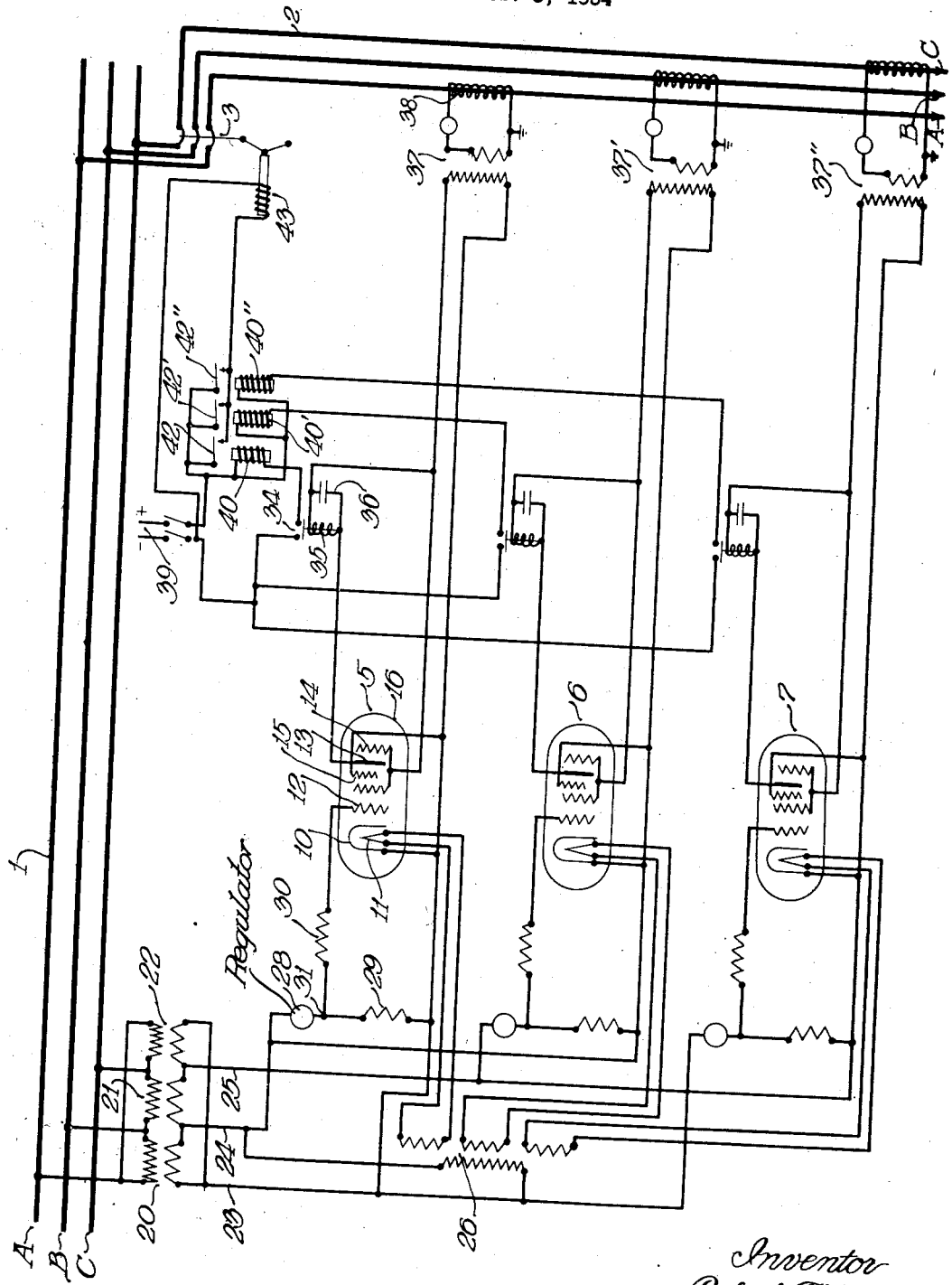

Patented Sept. 21, 1937

2,093,626

UNITED STATES PATENT OFFICE 2,093,626

POWER DIRECTIONAL RELAY

Robert I. Ward, Chicago, Ill.

Application February 8, 1934, Serial No. 710,288

1 Claim. (Cl. 175—294)

The present invention relates to means for protecting an alternating current line against reverse power flow.

There is no great difficulty in providing a reverse power relay which will operate upon a reversal of power when the system voltage is not substantially reduced. Also, there is no particular difficulty in providing a reverse power relay to operate at any specified fractional percentage of the line voltage. However, there is comparatively great difficulty in providing a directional relay which will operate at normal voltage and will also operate at, say, one per cent of normal line voltage. A reversal of power flow may be caused by a short circuit at an adjacent part of the line, in which event the line voltage may drop to one per cent of the normal voltage. If the protecting apparatus is made sensitive to that voltage it may be ruined in the event that there is a reversal of the power flow brought about by other factors which do not substantially reduce the line voltage. If the apparatus is adjusted for operation at normal line voltage it will not operate when the voltage drops to a negligible value. It is an object of the present invention to overcome the difficulties due to these apparently contradictory requirements.

I have devised a relay arrangement wherein the sensitive element comprises a hot cathode tube which provides a degree of sensitivity combined with reliability hitherto unknown. This arrangement may be made directional at ½ of 1% of normal voltage and operate in 1/20 of a second upon a reversal of power of 1500% load. Yet this same apparatus will also operate at the normal line voltage.

The sensitive element of my protective device comprises a thermionic tube the plate of which is connected in a circuit so that its voltage bears a definite, and substantially fixed, phase relationship to the current in the line. The grid of the tube is connected in a circuit so that the voltage of the grid bears a definite, and fixed, phase relationship to the voltage of the line, so that the current through the plate circuit is determined by the grid voltage and the plate voltage and thereby is determined by the phase relationship between the current and the voltage in the line. This phase relationship is a function of the direction of power flow.

The plate and grid voltages are approximately 180° apart under normal line operating conditions, so that during one-half of each cycle the grid is negative and prevents plate current flow, and during the other half of each cycle the plate is negative, so that no plate current can flow. I provide a regulator in the grid circuit in order to control, and substantially reduce, fluctuations in the grid voltage when the line voltage drops, as during short-circuit conditions. The regulator comprises a circuit including a resistance, in the form of a lamp, the value of which increases enormously with increase in temperature. At normal line voltage there is a certain current flowing through the lamp, sufficient to heat it, so that the lamp has a very high resistance. This lamp is connected in series with the grid, thereby substantially reducing the grid voltage when the line is at its normal voltage. In the event of a short circuit on the line, resulting in a very great drop in line voltage, very little current flows through the lamp, so that the lamp is not heated. The resistance of the lamp is then low, and it causes a negligible reduction of the voltage applied to the grid, whereby the grid voltage is a larger proportion of the line voltage when the line voltage is low than it is when the line voltage is high.

It is a further object of the present invention to provide a reverse power protecting system, of the type above set forth, employing a five element tube, that is, including a screen grid and a suppressor grid in addition to the cathode, the anode, and the usual grid. I have provided a circuit arrangement that permits the use of such a tube for reverse power directional protection wherein the screen grid and the suppressor grid effectively prevent false operation due to emission of electrons from the plate brought about by bombardment of the plate by electrons from the cathode. By this arrangement the apparatus may be made more sensitive, without danger of false operation.

The circuit arrangement is such that under normal operating conditions there is substantially no current flowing through the plate circuit. Under conditions such as prevail when power flows in the wrong direction in the power line, current will flow through the plate circuit as above set forth. A relay is connected in the plate circuit to respond to this current and effect protective switching operations which, in this instance, comprises the tripping of a circuit breaker. In order to prevent the inductance of the relay from adversely affecting the operation of the plate circuit I shunt the relay winding with a condenser so that the capacity current of the condenser will compensate for the inductive current of the relay winding. The provision of this condenser must be distinguished from the usual non-sparking condenser connected across relay contacts. This condenser is connected across the relay winding, not across the relay contacts.

The attainment of the above and further objects of the present invention will be apparent from the following specification, taken in conjunction with the accompanying drawing forming a part thereof.

In the drawing, the single figure illustrates, diagrammatically, a circuit embodying the principles of my invention.

Reference may now be had more particularly to the drawing. A three-phase alternating current power line is indicated at 1, and supplies current to a branch 2 through the usual switching arrangement, indicated in the present instance by circuit breaker 3. The line 1 may comprise the station bus in a generating station or in a sub-station, or it may comprise a transmission line. The line 2 may comprise a feeder. The three phases of the power line are indicated at A, B, and C. Power normally flows from the line 1 to the line 2, but under abnormal conditions there may be a reversal of power flow so that power tends to flow from the line 2 to the line 1. This condition may be brought about when the lines 1 and 2 constitute part of a network wherein the line 2 has connected thereto, or connects with, a line or power source in addition to the line 1. The relay arrangement shown in the drawing is provided for the purpose of tripping the circuit breaker 3 upon the occurrence of a flow of power from the line 2 to the line 1.

Since the direction of flow of power in an alternating current system is a function of the phase relationship between the current and the voltage, the means provided for detecting a reversal in the direction of power flow must give some indication of a change in the phase angle. For this purpose I provide three thermionic tubes, indicated at 5, 6 and 7, one for each phase, the tubes being so connected that the current flowing in the respective plate circuits is a function of the relative phase angle of the current in the line 2 and the voltage of the line 1.

The three thermionic tubes 5, 6, and 7 are of identical construction and have the same circuit connections, so that a description of one will also suffice for the other two. The tube 5 comprises a cathode 10 heated by a heater 11, a grid 12, a plate or anode 13, a screen grid 14, and a suppressor grid 15, all enclosed in an evacuated glass chamber 16.

Three step-down transformers, indicated at 20, 21, and 22, supply reduced voltage at their secondary sides, to conductors 23, 24, and 25. A step-down transformer 26, the primary of which is connected across the conductors 23 and 24, furnishes the necessary reduced voltage, at its secondary side, for heating the respective heaters 11 of the three tubes 5, 6, and 7. A regulator lamp 28 and a resistor 29 are connected in series across the conductors 23, 24. The lamp 28 comprises a tungsten filament lamp capable of increasing its resistance with increase of the system voltage up to the normal value of the system voltage, whereby upon short circuiting of the line, the potential impressed upon the lamp is such as to allow the lamp to cool, whereby its resistance is correspondingly decreased, so that it will allow a higher potential to be passed therethrough. The grid 12 is connected, through a resistor 30, to the point 31 between the lamp 28 and the resistor 29, so that the resistor 29 is in shunt with the cathode-grid-12 circuit. While the invention is not limited to any particular value of resistances, the same being determined by a number of constants including the characteristics of the tube and the voltage of the system, it may be well to mention the values of the resistors in one particular installation. In that installation the resistor 29 was of a value of 750 ohms, the resistor 30 of 2500 ohms, and the lamp resistance varied from 100 ohms when cold to 1000 ohms when hot. The voltage between conductors 23, 24 was 120 volts.

In the event of a short circuit on the line 1, resulting in a great drop in voltage, there is a corresponding drop in voltage across the conductors 23, 24, and a corresponding drop in current flow through the circuit, including the regulator-resistor 28 and the resistor 29. The drop in current permits the resistor 28 to cool, thus reducing its resistance from in the neighborhood of 1000 ohms to a value approximately $\frac{1}{10}$ of that. The voltage between the point 31 and the cathode of the tube 5 is therefore an appreciably larger proportion of the voltage across the conductors 23, 24 than it was when the regulator resistor 28 was at a value of 1000 ohms. Thus the resistor 28 serves to prevent too great a drop in the cathode-grid voltage when the voltage of the line 1 drops. This assures proper functioning of the grid 12 even though the voltage of the line 1 drops to a value which is a small fraction of its normal value.

The provision of the automatic regulating resistor 28 overcomes what was previously a very serious fault with power directional relays of the type here involved. In the absence of an automatic regulating resistor 28, the voltage between the cathode 10 and the grid 12 would vary approximately in direct proportion to the variations in the voltage of the line 1. If the constants of the circuit were adjusted to function properly upon reversal of power flow when the line voltage was at its normal value, the tube would cease to function, for reverse power protection, when the line voltage happened to drop to a very low value such as prevails during short circuiting fault conditions. By my present arrangement, including the automatic regulating lamp resistor 28, the fluctuations in grid voltage are made but a small proportion of the fluctuation in the line voltage, thereby assuring the proper operation of the protective device even during short-circuiting conditions.

The circuit of the plate 13 extends through the winding of a relay 35, which is shunted by a condenser 36, to the secondary side of a transformer 37. The primary side of this transformer is connected across a current transformer 38 that is supplied with current in proportion to the current flowing in the A-phase conductor of the line 2. The voltage of the secondary of the transformer 37 is also applied to the screen grid 14. The transformer 37 saturates at a value of primary current flow somewhat less than 300% of the normal full load current flow through the primary. Thus, in the event of a severe fault on the A-phase conductor of the line 2, as a direct ground thereon, resulting in a very large current flow, the saturation of the iron core of the transformer 37 will prevent a rise of voltage on the secondary side of that transformer to a value more than 300% of the normal voltage. This prevents injury to the tube 5, such as would occur if an excessive voltage were applied to the plate 13 or to the screen grid 14. The transformer 37 is thus made inherently self-regulating. Preferably, but not necessarily, the transformer 37 is of a construction such as to give a peaked wave on the secondary side thereof.

The circuits for the B and C phases, including the transformers 37' and 37'', are the same as the circuit for the A-phase.

When current flows through the circuit of the plate 13, it causes an energization of the relay 35 which, at its contacts 34, closes a circuit for the operating winding of a relay 40 from a direct current bus or storage battery 39. The relays 40' and 40'' are controlled, respectively, by the thermionic tubes 6 and 7, in the same manner as is the relay 40. Energization of the relay 40' causes a closure of its normally open contacts 42', and energization of the relay 40'' causes closure of its normally open contacts 42''. The contacts 42, 42', 42'' are connected in parallel so that upon closure of any one set of contacts there is established a circuit for the tripping winding 43 of the circuit breaker 3, thus tripping the circuit breaker.

While I have here shown circuit breaker 3 as a three-pole breaker it is apparent that individual circuit breakers may be provided for each of the three phases, in which event the respective sets of contacts 42, 42', 42'' would be connected to the tripping coils of the respective circuit breakers, so that closure of any one set of contacts would result in tripping of only the one associated circuit breaker.

From the description thus far given it is apparent that there is a fixed phase relationship between the voltage applied to the plate 13 and the current in the A-phase conductor of the line 2, and there is a fixed phase relationship between the voltage on the grid 12 and the line 1. Therefore, the phase relationship between the voltage on the grid 12 and the voltage on the plate 13 varies directly as the phase relationship between the voltage of the line 1 and the current in the line 2. The polarity of the instantaneous voltages on the grid 12 and on the plate 13 are such that substantially no current can flow through the plate circuit when the direction of power flow is from the line 1 to the line 2, which is assumed to be the normal direction of power flow. During one half of the cycle the grid 12 prevents the flow of current in the plate circuit. During the other half of the cycle the potential on the plate is such that no current can flow through the plate circuit. The polarities of the plate and grid voltages are approximately 180° apart under normal operating conditions. For one half of the cycle the grid is negative and the plate is positive. During this half of the cycle the grid prevents plate current flow. During the other half of the cycle the grid is positive, but the plate is negative. No plate current can flow during that half of the cycle.

Should there be a reversal of the power flow in the line 2, the phase relationship of the current to the voltage will be reversed. The grid and plate voltages will therefore now be approximately in phase. On one half of the cycle the grid and plate voltages are negative, and no plate current flows. On the other half of the cycle both plate and grid are positive and current does flow through the plate circuit. This brings about operation of the relay 35 which causes operation of the relay 40 and consequent tripping of the circuit breaker 3.

The screen grid 14 serves to eliminate practically the entire grid-to-plate capacitance in the tube itself. Because of the presence of the screen grid very close to the plate 13, there is a danger that electrons emitted from the plate by the bombardment thereof by electrons from the cathode may be attracted to the screen grid. This is particularly true if the plate voltage happens to swing lower than the screen grid voltage. The suppressor grid 15 serves to remove this danger. The suppressor is at the voltage of the cathode 10 and, because of its negative potential with respect to the plate, when there happens to be plate current flow, it retards the flight of secondary electrons from the plate and diverts them back to the plate. By this arrangement there is a very high gain in the power output of the tube 5.

It is to be noted that the heater 11 is energized from the main line 1 so that the thermionic tubes 5—6—7 are in operating condition even when the circuit breaker 3 is tripped and the line 2 is dead. This is of considerable importance in that it permits protection of the line 1 against reverse power flow thereinto from the line 2 even at the instant the circuit breaker 3 is closed. If the cathode 11 were heated by energy derived from the line 2, rather than from the line 1, a closure of the circuit breaker 3 would not result in immediate protection against reverse power flow since the hot cathode tubes 5—6—7 are not operative until the heater 11 has heated the cathode 10 to a predetermined temperature, which would mean a certain delay before protection is obtainable. By the applicant's present arrangement, the cathode is heated even when the circuit breaker 3 is open, so that reverse power protection is available the instant that the circuit breaker 3 is closed.

If desired, the heaters 11 may receive energy from a source other than the transformer 26, that is, from a source independent of the line 1, as from a storage battery. This would permit heating of the cathode even when the line 1 is dead.

In the system shown in the drawing, deenergization of the line 1 results in deenergization of the heater circuit 11. The tubes 5—6—7 are, preferably, of a high heat storage capacity and a low heat radiating capacity so that, while they take an appreciable amount of time to heat to their proper operating temperature, they maintain that heat for an appreciable time interval after the heater circuit is opened. Therefore, opening of the heater circuit for small intervals of time does not destroy the reverse power protection afforded by the thermionic tubes. Almost any desired time-heat-characteristic of the tubes may be obtained, as is well known in the art so that, if desired, the tubes may be made so that they will remain hot, to an operative degree, for as long as two minutes after the heater circuit is opened, or even longer. Therefore reverse power protection is available immediately upon reenergizing the line 1 after a short interruption in service.

In compliance with the requirements of the patent statutes I have herein shown and described a preferred embodiment of my invention. It is, however, to be understood that the invention is not limited to the precise circuit arrangement herein shown, the same being merely illustrative of the principles of my invention.

What I consider new and desire to secure by Letters Patent is:

The combination, with a power directional relay of the thermionic type having a grid circuit and a plate circuit normally energized in opposite phase relation, said grid circuit being energized from an alternating current line through a potential transformer and said plate circuit being energized from said line through a current transformer, of control means for said grid circuit comprising a regulator and a resistor connected in series circuit relation and between said potential transformer and said grid circuit, said regulator limiting the potential applied to said grid circuit to a predetermined fraction of the line voltage during normal line operating conditions sufficient to prevent predetermined plate current flow and decreasing its limiting effect as the line voltage decreases in such manner as to maintain said potential applied to said grid circuit above a predetermined minimum value sufficient to prevent said predetermined plate current flow under maximum overload fault conditions on said line unaccompanied by reverse power flow therein.

ROBT. I. WARD.